United States Patent
Miyano

(10) Patent No.: US 10,059,855 B2
(45) Date of Patent: Aug. 28, 2018

(54) PHOTOCURABLE INKJET INK AND IMAGE FORMING METHOD

(71) Applicant: Konica Minolta, Inc., Tokyo (JP)

(72) Inventor: Masashi Miyano, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 21 days.

(21) Appl. No.: 15/203,285

(22) Filed: Jul. 6, 2016

(65) Prior Publication Data

US 2017/0009094 A1    Jan. 12, 2017

(30) Foreign Application Priority Data

Jul. 10, 2015  (JP) ................................. 2015-138906

(51) Int. Cl.
| | | |
|---|---|---|
| *B41J 2/21* | (2006.01) | |
| *C09D 11/38* | (2014.01) | |
| *C09D 11/101* | (2014.01) | |
| *B41J 11/00* | (2006.01) | |

(52) U.S. Cl.
CPC ............ *C09D 11/38* (2013.01); *B41J 2/2107* (2013.01); *B41J 11/002* (2013.01); *C09D 11/101* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 11/0015; B41J 11/002; B41J 2/2056; B41J 2/21; B41J 2/0057; B41J 3/60; B41J 2002/012; B41J 2/04598; B41J 2/04586; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
See application file for complete search history.

(56) References Cited

U.S. PATENT DOCUMENTS

2013/0044168 A1*  2/2013  Kaga .................... B41M 5/0023
                                                         347/102

FOREIGN PATENT DOCUMENTS

| EP | 2-508-349 A1 | 10/2012 |
|---|---|---|
| JP | 2013119243 A | 6/2013 |
| JP | 2013-227410 A | 11/2013 |
| JP | 2014070104 A | 4/2014 |
| JP | 2014159114 A | 9/2014 |
| WO | 2013-046699 A1 | 4/2013 |

OTHER PUBLICATIONS

Extended European Search Report dated Nov. 23, 2016 from corresponding European Application; Application No./Patent No. 16178311.3-1302; Applicant: Konica Minolta, Inc.; Total of 6 pages.

* cited by examiner

*Primary Examiner* — Manish S Shah

(74) *Attorney, Agent, or Firm* — Lucas & Mercanti, LLP

(57) ABSTRACT

An object of the present invention is to provide a photocurable inkjet ink having favorable discharge stability and a reduced odor. The photocurable inkjet ink of the present invention contains a photopolymerizable compound, a photopolymerization initiator, and a gelling agent; the content of the gelling agent is 0.5 mass % or more to 10 mass % or less based on the photocurable inkjet ink; and the photocurable inkjet ink further contains 10 mass ppm or more to 100 mass ppm or less of the compound which has a molecular weight of 200 or less and which contains a hydrophobic moiety having four or more carbon atoms Sbased on the photocurable inkjet ink.

11 Claims, No Drawings

PHOTOCURABLE INKJET INK AND IMAGE FORMING METHOD

CROSS REFERENCE TO RELATED APPLICATIONS

This application is entitled to and claims the benefit of Japanese Patent Application No. 2015-138906, filed on Jul. 10, 2015, the disclosure of which including the specification, drawings and abstract is incorporated herein by reference in its entirety.

BACKGROUND OF THE INVENTION

1. Field of the Invention

The present invention relates to a photocurable inkjet ink and an image forming method.

2. Description of Related Art

Inkjet recording methods have been used in various printing fields, since the methods enable simple and inexpensive image formation. One example of the inkjet recording methods is an UV curable inkjet method in which UV curable ink droplets are landed on a recording medium, and then irradiated with UV rays to form an image. The UV curable inkjet method has recently been drawing attention, since an image having high rubfastness and adhesiveness can be formed also on a recording medium without ink absorbency.

As a method for increasing the pinning property of an UV curable inkjet ink, for example, addition of a gelling agent to an ink for temperature-induced sol-gel phase transition has been studied. Specifically, studies have been made to prevent combining of dots by discharging liquid ink droplets at high temperature and cooling the ink droplets for gelation at the same time they are landed on a recording medium.

The UV curable inkjet ink is typically likely to generate an odor, due to components volatilized from a decomposed matter of an initiator or an unreacted monomer. As a method for reducing such an odor, there have been proposed a method of curing an ink under low oxygen partial pressure to suppress polymerization inhibition by oxygen for reducing unreacted components (e.g., Japanese Patent Application Laid-Open No. 2014-159114: Patent Literature 1; hereinafter, referred to as PTL 1); and a method of introducing a polymerizable group into an initiator to suppress the decomposition of the initiator (e.g., Japanese Patent Application Laid-Open No. 2014-70104: Patent Literature 2; hereinafter, referred to as PTL 2).

It is desirable that an UV curable inkjet ink containing a gelling agent enables the gelling agent to be further dissolved therein stably. As a method for stably dissolving the gelling agent, there has been proposed an UV curable inkjet ink containing a specific hydrophobic (meth)acrylate compound and a polyester acrylate oligomer (e.g., Japanese Patent Application Laid-Open No. 2013-119243: Patent Literature 3; hereinafter, referred to as PTL 3).

SUMMARY OF THE INVENTION

An UV curable inkjet ink containing a gelling agent is discharged as a liquid heated to high temperature. Accordingly, the ink is required to suppress the odor at a higher degree than before. However, the methods disclosed in PTLs 1 and 2 cannot suppress the odor sufficiently. The method disclosed in PTL 3 is also required to suppress the odor at a higher degree.

To overcome the problem, the present inventors have found that components causing the odor are trace amounts of low molecular weight compounds derived from photopolymerizable compounds. By regulating the content of the low molecular weight compounds to a certain degree or lower, it becomes possible to suppress the odor during ink discharge at a high degree. However, it has been newly found that, when the contents of the low molecular weight compounds are reduced too much, crystals of the gelling agent are precipitated during the discharge of an UV curable inkjet ink containing the gelling agent, causing discharge deficiency. Thus, the UV curable inkjet ink containing a gelling agent is required to achieve both the reduction in odor and discharge stability at a high level.

The present invention has been achieved in light of the foregoing circumstances, and an object of the present invention is to provide a photocurable inkjet ink having favorable discharge stability and a reduced odor, and an image forming method using the photocurable inkjet ink.

[1] A photocurable inkjet ink containing a photopolymerizable compound, a photopolymerization initiator, and a gelling agent, in which a content of the gelling agent is 0.5 mass % or more to 10 mass % or less based on the photocurable inkjet ink, and the photocurable inkjet ink further contains 10 mass ppm or more to 100 mass ppm or less of a low molecular weight compound which has a molecular weight of 200 or less and which contains a hydrophobic group having four or more carbon atoms (provided that the low molecular weight compound is different from the photopolymerizable compound) based on the photocurable inkjet ink.

[2] The photocurable inkjet ink according to [1], in which the photopolymerizable compound is a radical polymerizable compound, and the radical polymerizable compound contains a multifunctional radical polymerizable compound.

[3] The photocurable inkjet ink according to [1] or [2], in which a content of the multifunctional radical polymerizable compound is 70 mass % or more based on a total mass of the photopolymerizable compound.

[4] The photocurable inkjet ink according to any one of [1] to [3], in which the low molecular weight compound is at least one low molecular weight compound selected from the group consisting of 1-octanol, 1-dodecanol, 2-ethylhexanol, butylacrylate and phenoxyethylacrylate.

[5] The photocurable inkjet ink according to any one of [1] to [4], in which a content of the low molecular weight compound is 30 mass ppm or more to 100 mass ppm or less based on the photocurable inkjet ink.

[6] The photocurable inkjet ink according to any one of [1] to [5], in which the gelling agent is at least one gelling agent selected from the group consisting of aliphatic ketones, aliphatic esters, higher fatty acids, higher alcohols, and amide compounds, which contain a hydrocarbon group having fourteen or more carbon atoms.

[7] The photocurable inkjet ink according to any one of [1] to [6], in which the gelling agent is an aliphatic ketone represented by general formula (G1):

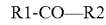   General formula (G1):

where each of R1 and R2 is a $C_9$-$C_{25}$ linear or branched hydrocarbon group, or an aliphatic ester represented by general formula (G2):

   General formula (G2):

where each of R3 and R4 is a $C_9$-$C_{25}$ linear or branched hydrocarbon group.

[8] The photocurable inkjet ink according to any one of [1] to [7], in which the photocurable inkjet ink further contains a pigment.

[9] The photocurable inkjet ink according to any one of [1] to [8], in which a C log P value of the low molecular weight compound is 2.0 or more to 5.0 or less.

[10] The photocurable inkjet ink according to any one of [1] to [9], in which the low molecular weight compound is at least one low molecular weight compound selected from the group consisting of 1-octanol, 1-dodecanol, and 2-ethylhexanol.

[11] The photocurable inkjet ink according to any one of [1] to [9], in which the low molecular weight compound is at least one low molecular weight compound selected from the group consisting of butylacrylate and phenoxyethylacrylate.

[12] An image forming method including: discharging the photocurable inkjet ink according to any one of [1] to [11] from a nozzle of an inkjet head to land the ink on a recording medium; and irradiating the landed ink with actinic radiation to cure the ink.

According to the present invention, it is possible to provide a photocurable inkjet ink having favorable discharge stability and a reduced odor, and an image forming method using the photocurable inkjet ink.

DESCRIPTION OF THE PREFERRED EMBODIMENTS

As described above, the present inventors have found that a component causing an odor is a specific low molecular weight compound derived from a photopolymerizable compound. By regulating the content of the specific low molecular weight compound to a certain degree or lower, it becomes possible to significantly reduce the odor during ink discharge.

On the other hand, it has been found that, when the content of the specific low molecular weight compound is reduced too much, a gelling agent in an ink is crystallized during discharge, causing discharge deficiency. While the reason for this discharge deficiency still remains unclear, it is assumed that the solubility of the gelling agent in the ink is lowered. That is, it is assumed that the specific low molecular weight compound causes an odor, while the compound is easily compatible with the gelling agent and thus have a function of enhancing the solubility of the gelling agent. Accordingly, by regulating the content of the specific low molecular weight compound to a certain degree or higher, it becomes possible to suppress the discharge deficiency of the ink, since the solubility of the gelling gent is not impaired.

Further, by employing a specific gelling agent, it becomes possible to particularly enhance the compatibility with the low molecular weight compound, thus enabling the solubility of the gelling agent to be enhanced effectively. The present invention has been achieved based on the knowledge.

1. Inkjet Ink

The photocurable inkjet ink of the present invention contains a photopolymerizable compound, a photopolymerization initiator, a gelling agent, and a specific low molecular weight compound (compound having a molecular weight of 200 or less and containing a hydrophobic group having four or more carbon atoms).

1-1. Photopolymerizable Compound

The photopolymerizable compound is a compound which is crosslinked or polymerized upon irradiation with actinic radiation. Examples of the actinic radiation include UV rays, electron rays, $\alpha$-rays, $\gamma$-rays, and X-rays. From the viewpoints of safety and of enabling polymerization and crosslinking to occur even with less amount of energy, UV rays or electron rays are preferred.

The photopolymerizable compound may be a radical polymerizable compound or a cationic polymerizable compound. From the viewpoints of allowing polymerization and crosslinking to easily occur, and of selection from a wide variety of compounds depending on images to be formed, the photopolymerizable compound is preferably a radical polymerizable compound.

The radical polymerizable compound is a compound having a radically polymerizable ethylenic unsaturated bond. The radical polymerizable compound may be any of a monomer, a polymerizable oligomer, a prepolymer, and a mixture thereof. The radical polymerizable compound may be contained singly or in combination in the ink.

Examples of the compound having a radically polymerizable ethylenic unsaturated bond include an unsaturated carboxylic acid and a salt thereof, an unsaturated carboxylic acid ester compound, an unsaturated carboxylic acid urethane compound, an unsaturated carboxylic acid amide compound and an anhydride thereof, acrylonitrile, styrene, an unsaturated polyester, an unsaturated polyether, an unsaturated polyamide, and an unsaturated urethane. Examples of the unsaturated carboxylic acid include (meth)acrylic acid, itaconic acid, crotonic acid, isocrotonic acid and maleic acid.

Among those, the radical polymerizable compound is preferably an unsaturated carboxylic acid ester compound, and more preferably a (meth)acrylate. As used herein, "(meth)acrylate" means an acrylate or a (meth)acrylate; "(meth)acryloyl group" means an acryloyl group or a (meth)acryloyl group; and "(meth)acrylic" means acrylic or (meth)acrylic.

Examples of the (meth)acrylate include monofunctional (meth)acrylate, bifunctional (meth)acrylate, and tri- or higher polyfunctional (meth)acrylate.

The monofunctional or bifunctional (meth)acrylate differs from a monofunctional or bifunctional (meth)acrylate as the specific low molecular weight compound, and is specifically a monofunctional or bifunctional (meth)acrylate having a molecular weight of more than 200. Examples of such a monofunctional or bifunctional (meth)acrylate include stearyl (meth)acrylate, lauryl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxy ethylhexahydrophthalic acid, butoxy ethyl (meth)acrylate, methoxypolyethylene glycol (meth)acrylate, tetrahydrofurfuryl (meth)acrylate, isobornyl (meth)acrylate, 2-hydroxy-3-phenoxypropyl (meth)acrylate, 2-(meth)acryloyloxyethylsuccinic acid, 2-(meth)acryloyloxy ethylphthalic acid, 2-(meth)acryloyloxy ethyl-2-hydroxyethyl-phthalic acid, and t-butylcyclohexyl (meth)acrylate.

Examples of the bifunctional (meth)acrylate include triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,6-hexanediol di(meth)acrylate, 1,9-nonanediol di(meth)acrylate, neopentyl glycol di(meth)acrylate, dioxane glycol diacrylate, dimethylol-tricyclodecane di(meth)acrylate, bisphenol A PO adduct di(meth)acrylate, hydroxypivalic acid neopentyl glycol di(meth)

acrylate, polytetramethylene glycol di(meth)acrylate, polyethylene glycol diacrylate, and tripropylene glycol diacrylate.

Examples of the tri- or higher polyfunctional (meth) acrylate include trimethylolpropane tri(meth)acrylate, pentaerythritol tri(meth)acrylate, pentaerythritol tetra(meth) acrylate, dipentaerythritol hexa(meth)acrylate, ditrimethylolpropane tetra(meth)acrylate, glycerol propoxy tri(meth)acrylate, and pentaerythritol ethoxy tetra(meth) acrylate.

The (meth)acrylate may include an ethylene oxide-modified (meth)acrylate. The ethylene oxide-modified (meth) acrylate has higher photosensitivity. Further, the ethylene oxide-modified (meth)acrylate is easily contained in a card house structure when the ink is gelled at a low temperature, and is compatible more easily with other ink components even at a high temperature. Furthermore, the ethylene oxide-modified (meth)acrylate undergoes less curing shrinkage, so that curling of a printed matter does not easily occur during image formation.

Examples of the ethylene oxide-modified (meth)acrylate include trimethylolpropane EO-modified triacrylate. Examples of commercially available products of the ethylene oxide-modified (meth)acrylate include CD561, SR454, SR499, and SR494 (manufactured by Sartomer Company, Inc.), as well as NK ESTER A-400, NK ESTER A-600, NK ESTER 9G and NK ESTER 14G (manufactured by Shin Nakamura Chemical Co., Ltd).

The radical polymerizable compound preferably includes a polyfunctional (bifunctional or higher polyfunctional) radical polymerizable compound, and more preferably a polyfunctional (meth)acrylate. This is because the polyfunctional radical polymerizable compound has high sensitivity to actinic radiation, and thus can easily achieve high curability. The content rate of the polyfunctional radical polymerizable compound is preferably 70 mass % or more, more preferably 80 mass % or more, even more preferably 90 mass % or more, and particularly preferably 100 mass %, based on the total amount of a photopolymerizable compound (preferably a radical polymerizable compound).

The content of the photopolymerizable compound can be set at 1 mass % or more to 97 mass % or less, for example, and is preferably set at 30 mass % or more to 95 mass % or less, based on the total mass of the ink.

1-2. Photopolymerization Initiator

The photopolymerization initiator is a photoradical initiator when the photopolymerizable compound is a radical polymerizable compound; the photopolymerization initiator is a photoacid-generating agent when the photopolymerizable compound is a cationic polymerizable compound. Since the photopolymerizable compound is preferably a radical polymerizable compound as described above, the photopolymerization initiator is preferably a photoradical initiator.

The photoradical initiator may be a cleaving type radical initiator or a hydrogen withdrawing type radical initiator.

Examples of the cleaving type radical initiator include acetophenone initiators such as diethoxy acetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy) phenyl-(2-hydroxy-2-propyl)ketone, 1-hydroxycyclohexyl-phenyl ketone, 2-methyl-2-morpholino-(4-thiomethylphenyl)propan-1-one, and 2-benzyl-2-dimethylamino-1-(4-morpholinophenyl)-butanone; benzoin initiators such as benzoin, benzoin methyl ether and benzoin isopropyl ether; acyl phosphine oxide initiators such as 2,4,6-trimethyl benzoin diphenyl phosphine oxide; benzyl, and methylphenyl glyoxy ester.

Examples of the hydrogen withdrawing type radical initiator include benzophenone initiators such as benzophenone, o-benzoyl benzoic acid methyl-4-phenyl benzophenone, 4,4'-dichloro benzophenone, hydroxy benzophenone, 4-benzoyl-4'-methyl-diphenylsulfide, acrylated benzophenone, 3,3',4,4'-tetra-(t-butylperoxycarbonyl)benzophenone, and 3,3'-dimethyl-4-methoxybenzophenone; thioxanthone initiators such as 2-isopropyl thioxanthone, 2,4-dimethyl thioxanthone, 2,4-diethyl thioxanthone, and 2,4-dichloro thioxanthone; aminobenzophenone initiators such as Michler's ketone and 4,4'-diethylaminobenzophenone; 10-butyl-2-chloro acridone, 2-ethyl anthraquinone, 9,10-phenanthrene quinone, and camphor quinone.

Any content of the photopolymerization initiator is possible as long as the content is in such a range as to sufficiently cure the photopolymerizable compound, and the content can be set at 0.01 mass % or more to 10 mass % or less.

1-3. Gelling Agent

The gelling agent has a function of converting ink droplets landed on a recording medium into a gel state for temporal fixing (pinning). When an ink containing the gelling agent is pinned in the gel state, the ink is prevented from spreading, and thus neighboring dots are not easily combined, so that a higher-definition image can be formed.

The gelling agent is preferably crystallized at a temperature equal to or lower than a gelation temperature of the ink. The gelation temperature refers to a temperature at which the gelling agent undergoes sol-gel transition from sol to gel when an ink solating or liquefying from heating is cooled, causing the viscosity of the ink to abruptly change. Specifically, the solating or liquefying ink is continued to be cooled, while measuring the viscosity thereof using a viscoelasticity meter (e.g., MCR300, manufactured by Physica Messtechnik GmbH), and a temperature at which the viscosity is increased abruptly can be set as the gelation temperature of the ink.

When the gelling agent is crystallized in an ink, a structure in which the photopolymerizable compound is contained in a space three-dimensionally formed by the gelling agent crystallized into a plate-like shape may be formed (such a structure is hereinafter referred to as "card house structure"). When the card house structure is formed, a liquid photopolymerizable compound is held in the space, and thus ink droplets are less likely to spread, so that the pinning properties of the ink are enhanced further. When the pinning properties of the ink are enhanced, ink droplets landed on a recording medium become less likely to be combined, so that a higher-definition image can be formed.

In order to form the card house structure, it is preferable that the gelling agent and the photopolymerizable compound dissolved in the ink are compatible with each other.

Examples of the gelling agent suitable for the formation of the card house structure include an aliphatic ketone, an aliphatic ester, a petroleum wax, a plant-derived wax, an animal-derived wax, a mineral wax, hydrogenated castor oil, a modified wax, a higher fatty acid, a higher alcohol, a hydroxystearic acid, fatty acid amides such as an N-substituted fatty acid amide and a specialty fatty acid amide, a higher amine, a sucrose fatty acid ester, a synthetic wax, dibenzylidene sorbitol, a dimer acid, and a dimer diol. Among those, from the viewpoint of further enhancing the pinning properties, an aliphatic ketone, an aliphatic ester, a higher fatty acid, a higher alcohol, and a fatty acid amide containing a hydrocarbon group having fourteen or more carbon atoms are preferred. The gelling agent may be contained singly or in combination in the ink.

Examples of the aliphatic ketone include dilignoceryl ketone, dibehenyl ketone, distearyl ketone, dieicosyl ketone, dipalmityl ketone, dilauryl ketone, dimyristyl ketone, myristyl palmityl ketone, and palmityl stearyl ketone.

Examples of the aliphatic ester include monoalcohol fatty acid esters such as behenyl behenate, icosyl icosanoate, and oleyl palmitate; and polyhydric alcohol fatty acid esters such as glycerin fatty acid ester, sorbitan fatty acid ester, propylene glycol fatty acid ester, ethylene glycol fatty acid ester, and polyoxyethylene fatty acid ester. Examples of commercially available products of the aliphatic ester include EMALEX series manufactured by Nihon Emulsion Co., Ltd. ("EMALEX" is a registered trademark of this company), and RIKEMAL series and POEM series manufactured by Riken Vitamin Co., Ltd. ("RIKEMAL" and "POEM" are both registered trademarks of this company).

Examples of the higher fatty acid include behenic acid, arachidic acid, stearic acid, palmitic acid, myristic acid, lauric acid, oleic acid, and erucic acid.

Examples of the higher alcohol include stearyl alcohol and behenyl alcohol.

Examples of the fatty acid amide include lauric acid amide, stearic acid amide, behenic acid amide, oleic acid amide, erucic acid amide, ricinoleic acid amide, and 12-hydroxystearic acid amide. Examples of commercially available products of the fatty acid amide include NIKKA AMIDE series manufactured by Nippon Kasei Chemical Co., Ltd. ("NIKKA AMIDE" is a registered trademark of this company), ITOWAX series manufactured by Itoh Oil Chemicals Co., Ltd., and FATTY AMID series manufactured by Kao Corporation.

Examples of the N-substituted fatty acid amide include N-stearyl stearic acid amide, and N-oleyl palmitic acid amide. Examples of the specialty fatty acid amide include N,N'-ethylene bisstearylamide, N,N'-ethylene bis-12-hydroxystearylamide, and N,N'-xylylene bisstearylamide.

Among those, an aliphatic ketone represented by the following general formula (G1) and an aliphatic ester represented by the following general formula (G2) are particularly preferred.

R1-CO—R2     General formula (G1):

where each of R1 and R2 is a $C_9$-$C_{25}$ linear or branched hydrocarbon group.

R3-COO—R4    General formula (G2):

where each of R3 and R4 is a $C_9$-$C_{25}$ linear or branched hydrocarbon group.

In the general formulas (G1) and (G2), since the linear or branched hydrocarbon group has nine or more carbon atoms, the crystallinity of the aliphatic ketone represented by the general formula (G1) or the aliphatic ester represented by the general formula (G2) is further enhanced, and a more sufficient space is generated in the above-mentioned card house structure. Accordingly, a photopolymerizable compound is more easily contained in the above-mentioned space sufficiently, so that the pinning properties of the ink are further enhanced. Since the linear or branched hydrocarbon group has twenty-five or less carbon atoms, the melting point of the aliphatic ketone represented by the general formula (G1) or the aliphatic ester represented by the general formula (G2) is not raised excessively, so that the ink does not need to be heated excessively during ink ejection.

From the viewpoints of raising the gelation temperature of the ink to allow the ink to gelate quickly after landing, and of enhancing the compatibility with a specific low molecular weight compound, it is preferable that at least one of R1 and R2 or at least one of R3 and R4 is a saturated hydrocarbon group having fourteen or more to less than twenty-three carbon atoms; and it is more preferable that each of R1 and R2 or each of R3 and R4 is a saturated hydrocarbon group having fourteen or more to less than twenty-three carbon atoms.

Examples of the aliphatic ketone represented by the general formula (G1) include dilignoceryl ketone (number of carbon atoms: 23-24), dibehenyl ketone (number of carbon atoms: 21-22), distearyl ketone (number of carbon atoms: 17-18), dieicosyl ketone (number of carbon atoms: 19-20), dipalmityl ketone (number of carbon atoms: 15-16), dimyristyl ketone (number of carbon atoms: 13-14), dilauryl ketone (number of carbon atoms: 11-12), lauryl myristyl ketone (number of carbon atoms: 11-14), lauryl palmityl ketone (11-16), myristyl palmityl ketone (13-16), myristyl stearyl ketone (13-18), myristyl behenyl ketone (13-22), palmityl stearyl ketone (15-18), palmityl behenyl ketone (15-22), and stearyl behenyl ketone (17-22). The numbers of carbons in the parentheses represent the numbers of carbons of the respective two hydrocarbon groups divided by a carbonyl group. Examples of commercially available products of the aliphatic ketone represented by the general formula (G1) include 18-Pentatriacontanon manufactured by AlfaAeser, Hentriacontan-16-on manufactured by AlfaAeser, and Kao Wax T1 manufactured by Kao Corporation.

Examples of the aliphatic ester represented by the general formula (G2) include behenyl behenate (number of carbon atoms: 21-22), icosyl icosanoate (number of carbon atoms: 19-20), stearyl stearate (number of carbon atoms: 17-18), palmityl stearate (number of carbon atoms: 17-16), lauryl stearate (number of carbon atoms: 17-12), cetyl palmitate (number of carbon atoms: 15-16), stearyl palmitate (number of carbon atoms: 15-18), myristyl myristate (number of carbon atoms: 13-14), cetyl myristate (number of carbon atoms: 13-16), octyl dodecyl myristate (number of carbon atoms: 13-20), stearyl oleate (number of carbon atoms: 17-18), stearyl erucate (number of carbon atoms: 21-18), stearyl linolate (number of carbon atoms: 17-18), behenyl oleate (number of carbon atoms: 18-22), and arachidyl linolate (number of carbon atoms: 17-20). The numbers of carbons in the parentheses represent the numbers of carbons of the respective two hydrocarbon groups divided by an ester group. Examples of commercially available products of the aliphatic ester represented by the general formula (G2) include UNISTAR-M-2222SL and SPERMACETI (manufactured by NOF Corporation; "UNISTAR" is a registered trademark of this company), EXCEPARL SS and EXCEPARL MY-M (manufactured by Kao Corporation; "EXCEPARL" is a registered trademark of this company), EMALEX CC-18 and EMALEX CC-10 (manufactured by Nihon Emulsion Co., Ltd.; "EMALEX" is a registered trademark of this company), and AMREPS PC (manufactured by Kokyu Alcohol Kogyo Co., Ltd.; "AMREPS" is a registered trademark of this company).

The content of the gelling agent is preferably 0.5 mass % or more to 10 mass % or less based on the total mass of the ink. By setting the content of the gelling agent at 0.5 mass % or more, the pinning properties of the ink can be sufficiently enhanced, so that a higher-definition image can be formed. In addition, by enhancing the pinning properties of the ink, insufficient color development as a result of the ink having entered the inside of a recording medium may be suppressed, especially when an image is formed on a water-absorbent recording medium. By setting the content of the gelling agent at 10 mass % or less, the gelling agent can be prevented from precipitating from the surface of the formed image, and the dischargeability of the ink from an inkjet head cannot be easily impaired. The content of the gelling agent is more preferably 1.0 mass % or more to 10 mass % or less, and even more preferably 1.5 mass % or more to 8 mass % or less based on the total mass of the ink.

1-4. Specific Low Molecular Weight Compound

The specific low molecular weight compound is a trace amount of a component derived from a photopolymerizable compound, and specifically may be a component remaining or mixed in the process of synthesizing the photopolymerizable compound. The specific low molecular weight compound may be "compound having a molecular weight of 200 or less and containing a hydrophobic group having four or more carbon atoms."

The hydrophobic group having four or more carbon atoms is preferably a hydrocarbon group having four or more carbon atoms. The hydrocarbon group may be an aliphatic group or an aromatic group. The aliphatic group may be a linear or branched, saturated or unsaturated aliphatic group.

The molecular weight of the specific low molecular weight compound is preferably 100 or more to 200 or less, and more preferably 120 or more to 200 or less. This is because the low molecular weight compound having a molecular weight of 200 or less has high volatility at a discharging temperature and the content thereof in the ink needs to be adjusted. The molecular weight of the specific low molecular weight compound is a formula weight determined by calculation from the atomic weight, and can be measured by GC/MS measurement.

The specific low molecular weight compound may be an alcohol, or a monofunctional or bifunctional (meth)acrylate, which may be a component derived from the (meth)acrylate being the photopolymerizable compound.

Examples of the alcohol include a linear or branched aliphatic alcohol having four or more carbon atoms such as 1-octanol, 1-dodecanol, and 2-ethylhexanol. Examples of the monofunctional or bifunctional (meth)acrylate include butylacrylate and phenoxyethylacrylate.

The specific low molecular weight compound may be a component whose weight change is 1% or more when 10 g of a specimen of this compound is charged into a vessel having a diameter of 48 mm and is heated at 100° C. for 200 minutes. Such a low molecular weight compound has high volatility and is likely to cause an odor.

The C log P value of the specific low molecular weight compound may be within a range of 2.0 or more to 5.0 or less. When the C log P value of the specific low molecular weight compound is 2.0 or more, the specific low molecular weight compound has sufficient hydrophobicity, and thus can enhance the solubility of the gelling agent, so that the precipitation of crystals of the gelling agent can be suppressed.

The term "Log P value" is a coefficient indicating the affinity of an organic compound to water and 1-octanol. The 1-octanol/water partition coefficient P is a partition equilibrium achieved when a trace amount of a compound is dissolved as a solute in a two-liquid phase solvent of 1-octanol and water, and is the ratio of equilibrium concentrations of the compound in the respective solvents, which is expressed as Log P, the logarithm to the base 10 of the partition coefficient. That is, the "log P value" is a logarithmic value of the partition coefficient of 1-octanol/water, and is known as an important parameter indicating the hydrophilicity and hydrophobicity of a molecule.

"C log P" is a Log P value found by calculation. The C log P value can be calculated by the fragment method, atomic approach method or the like. More specifically, in order to calculate the C log P value, the fragment method described in literatures (C. Hansch and A. Leo, "Substituent Constants for Correlation Analysis in Chemistry and Biology" (John Wiley & Sons, New York, 1969)), or commercially available software package described below may be used.

Software package: ChemDraw Ultra Ver. 8.0. (April 2003, CambridgeSoft Corporation, USA)

The C log P value described in the present specification is a C log P value calculated using the above-mentioned software package.

The content of the specific low molecular weight compound is preferably 10 mass ppm or more to 100 mass ppm or less based on the total mass of the ink. When the content of the specific low molecular weight compound is 10 mass ppm or more, the solubility of the gelling agent is easily enhanced sufficiently, so that the discharge deficiency due to the crystallization of the gelling agent is easily suppressed. When the content of the specific low molecular weight compound is 100 mass ppm or less, the volatile amount of the specific low molecular weight compound can be reduced, so that an odor can be reduced. In addition, by reducing the volatile amount of the low molecular weight compound, it becomes also possible to reduce the discharge deficiency due to the increased viscosity of the ink near a nozzle during discharging. The content of the specific low molecular weight compound is more preferably 20 mass ppm or more to 70 mass ppm or less, and even more preferably 30 mass ppm or more to 60 mass ppm or less.

The content of the specific low molecular weight compound can be adjusted with an arbitrary method. For example, a photopolymerizable compound may be purified before being prepared into an ink; alternatively a further specific low molecular weight compound may be added as necessary. The purification of the photopolymerizable compound can be performed, for example, by removing the specific low molecular weight compound by means of vacuuming or heating of a commercially available product or a synthesized photopolymerizable compound.

The identification and quantification of a low molecular weight compound contained in the ink can be performed by GC/MS measurement. Specifically, after an ink and methanol are mixed together such that the concentration of a photocurable compound is 5 mass %, components which are not dissolved (a gelling agent and a photopolymerization initiator) are separated to be removed by filtration or the like to obtain a solution sample of the photocurable compound. Then, GC/MS instruments HP6890GC/HP5973MSD are used for measurement under the following conditions:

(GC/MS Measurement Conditions)
Column: DB-624 manufactured by J&W Scientific, Inc.; internal diameter 0.25 mmid×length 30 m, film thickness 1.4 μm
Carrier gas: He (flow rate 1.2 mL/min)
Sample injection amount: 1 μL
Injection temperature: 100° C.
Heating profile: 50° C. (retention time 0 min)→20° C./min→250° C. (retention time 10 min)
Detector: MSD As for quantification of each component, a calibration curve for each component detected by mass spectrometry (MS) is prepared in advance, and a measurement value is collated with the calibration curve to be able to perform the quantification.

1-5. Other Components

The inkjet ink of the present invention may further contain other components as long as the effects of the present invention can be achieved. Examples of other components include a coloring material and a polymerization inhibitor. These components may be contained singly or in combination in the ink.

The coloring material is a dye or a pigment, and is preferably a pigment. Examples of the pigment include the following:

C.I. Pigment Yellow 1, 2, 3, 12, 13, 14, 16, 17, 73, 74, 75, 81, 83, 87, 93, 95, 97, 98, 109, 114, 120, 128, 129, 138, 150, 151, 154, 155, 180, 185, and 213

C.I. Pigment Red 5, 7, 12, 22, 38, 48:1, 48:2, 48:4, 49:1, 53:1, 57:1, 63:1, 101, 112, 122, 123, 144, 146, 168, 184, 185, and 202

C.I. Pigment Violet 19 and 23

C.I. Pigment Blue 1, 2, 3, 15:1, 15:2, 15:3, 15:4, 18, 22, 27, 29, and 60

C.I. Pigment Green 7 and 36

C.I. Pigment White 6, 18, and 21

C.I. Pigment Black 7

The average particle diameter of pigment particles in the ink is preferably 0.08 µm or more to 0.5 µm or less from the viewpoint of not impairing the dischargeability of the ink from an inkjet head. The average particle diameter of the pigment particles is determined by dynamic light scattering method using Zetasizer Nano ZSP manufactured by Malvern Instruments Ltd. Note that, since an ink containing a coloring material has high concentration and light is not transmitted with this measuring apparatus, the ink is diluted 200 times for measurement. The measuring temperature is set at ordinary temperature (25° C.). The maximum diameter of the pigment particles in the inkjet ink is preferably 0.3 µm or more to 10 µm or less.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazine, phenothiazine, p-benzoquinone, nitrosobenzene, 2,5-di-t-butyl-p-benzoquinone, dithiobenzoyl disulfide, picric acid, cupferrone, aluminum N-nitrosophenyl hydroxylamine, tri-p-nitrophenylmethyl, N-(3-oxyanilino-1, 3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

1-6. Physical Properties

From the viewpoint of enhancing the dischargeability of the ink from an inkjet head, the viscosity of the ink at 80° C. is preferably 3 mPa·s or more to 20 mPa·s or less. Further, from the viewpoint of sufficiently gelating the ink when the temperature is decreased upon landing of the ink, the viscosity of the ink at 25° C. is preferably 1,000 mPa·s or more.

The gelation temperature of the ink is preferably 40° C. or higher to 70° C. or lower. When the gelation temperature of the ink is 40° C. or higher, the ink quickly gelates after landing on a recording medium, so that the pinning properties are further enhanced. When the gelation temperature of the ink is 70° C. or lower, the ink does not easily gelate during discharging of the ink whose temperature is typically about 80° C. from an inkjet head, so that the ink can be discharged more stably.

The viscosity of the ink at 80° C., the viscosity thereof at 25° C., and gelation temperature of thereof can be determined by measuring a temperature change in dynamic viscoelasticity of the ink using a rheometer. Specifically, the viscosity and the gelation temperature can be measured by the following method. The ink is heated to 100° C., and cooled to 20° C. under conditions including a shear rate of 11.7 (l/s) and a temperature decrease rate of 0.1° C./s while measuring the viscosity using stress control type rheometer Physica MCR 301 (corn plate diameter: 75 mm, corn angle: 1.0°) manufactured by Anton Paar, Ltd., so as to obtain a temperature change curve of the viscosity. The viscosity at 80° C. and the viscosity at 25° C. are determined by reading the viscosities at 80° C. and 25° C., respectively, in the temperature change curve of the viscosity. The gelation temperature is determined as a temperature at which the viscosity is 200 mPa·s in the temperature change curve of the viscosity.

1-7. Preparation of Ink

The inkjet ink of the present invention can be obtained, for example, by mixing the above-mentioned components under heating. The resultant liquid mixture is preferably further filtered using a predetermined filter.

Preparation of the ink may be performed by preparing in advance a pigment dispersion in which a pigment is dispersed by a disperser, and by adding other components while heating. The pigment and the disperser can be dispersed using ball mill, sand mill, Attritor, roll mill, agitator, HENSCEL MIXER, colloid mill, ultrasound homogenizer, pearl mill, wet jet mill, or paint shaker, for example.

2. Image Forming Method

The image forming method of the present invention includes a first step of discharging the photocurable inkjet ink of the present invention from nozzles of an inkjet head to land the ink on a recording medium, and a second step of irradiating the ink landed on the recording medium with actinic radiation to cure the ink.

2-1. First Step

In the first step, ink droplets are discharged from the inkjet head to be landed on positions corresponding to an image to be formed on the recording medium.

Either an on-demand system or a continuous system may be employed as the method for discharging the ink from the inkjet head. As the on-demand inkjet head, any of electro-mechanical conversion systems such as single cavity type, double cavity type, bender type, piston type, share mode type and shared wall type, and electrothermal conversion systems such as thermal inkjet type or Bubble Jet ("Bubble Jet" is a registered trademark of Canon Inc.) type may be employed.

The discharge stability of ink droplets can be enhanced by discharging the ink droplets in a heated state from the inkjet head. The temperature of the ink during discharging is preferably set within a range of (gelation temperature of the ink+10)° C. or higher to (gelation temperature of the ink+30)° C. or lower. When the temperature of the ink in the inkjet head is lower than (gelation temperature+10)° C., the ink gelates in the inkjet head or at the surface of the nozzles, making the dischargeability of the ink likely to be lowered. On the other hand, when the temperature of the ink in the inkjet head exceeds (gelation temperature+30)° C., the temperature of the ink becomes excessively high, which may cause ink components to be degraded. The temperature of the ink during discharging is preferably 35° C. or higher to 100° C. or lower, and more preferably 35° C. or higher to 80° C. or lower in order to further enhance the discharge stability. It is preferable to eject the ink at such an ink temperature that the ink viscosity is particularly 7 mPa·s or more to 15 mPa·s or less, and more preferably 8 mPa·s or more to 13 mPa·s or less.

The method of heating the ink is not particularly limited. For example, it is possible to heat at least any of an ink supply system such as an ink tank, a supply pipe and an anterior ink tank immediately before a head; piping with a filter; a piezo head; and the like which compose a head carriage, using a panel heater, ribbon heater, heat-retaining water, or the like.

The amount of an ink droplet during discharging is preferably 2 pL or more to 20 pL or less, more preferably 2 pL or more to 10 pL or less, and even more preferably 2 pL or more to 5 pL or less, in terms of recording speed and image quality.

Although the recording medium is not particularly limited, examples thereof include a nonabsorbent recording medium (plastic base material) composed of plastic such as polyester, polyvinyl chloride, polyethylene, polyurethane, polypropylene, acrylic resin, polycarbonate, polystyrene, acrylonitrile-butadiene-styrene copolymer, polyethylene terephthalate or polybutadiene terephthalate, a nonabsorbent inorganic recording medium such as metals and glass, and nonabsorbent paper (e.g., printing coated sheet and printing coated paper B).

2-2. Second Step

In the second step, the ink landed on the recording medium in the first step is irradiated with actinic radiation to form an image with the ink being cured.

The actinic radiation can be selected, for example, from electron rays, ultraviolet rays, α-rays, γ-rays, X-rays, and the like, with ultraviolet rays being preferred. The irradiation of ultraviolet rays can be performed under the condition of a wavelength of 395 nm using a water-cooled LED manufactured by Phoseon Technology, for example. By using an LED as a light source, it becomes possible to suppress the occurrence of curing deficiency of the ink as a result of melting of the ink due to radiation heat of the light source.

The irradiation of ultraviolet rays is performed such that the peak illuminance of ultraviolet rays having a wavelength of 370 nm or more to 410 nm or less on the surface of an image is preferably 0.5 W/cm$^2$ or more to 10 W/cm$^2$ or less, and more preferably 1 W/cm$^2$ or more to 5 W/cm$^2$ or less. From the viewpoint of preventing the ink from being irradiated with radiation heat, the amount of light to irradiate the image is preferably less than 350 mJ/cm$^2$.

The irradiation of the actinic radiation is performed preferably within a time period of from 0.001 second or more to 1.0 second or less after the landing of the ink, and more preferably within a time period of 0.001 second or more to 0.5 second or less after the landing, in order to form a high-definition image.

The irradiation of the actinic radiation may be performed in two stages. First, the ink may be irradiated with actinic radiation to be cured temporarily within a time period of 0.001 second or more to 2.0 seconds or less after the landing of the ink, and the ink may be further irradiated with the actinic radiation to be fully cured after the end of the entire printing. By dividing the irradiation of the actinic radiation into two stages, shrinkage of a recording medium, which occurs during ink curing, is less likely to occur.

EXAMPLES

Hereinafter, the present invention is specifically described with reference to the examples. However, the present invention is not limited to the examples and so forth.

1. Ink Material (Low Molecular Weight Compound)
1-Octanol: molecular weight 130.2, C log P value: 2.81
1-Dodecanol: molecular weight 186.3, C log P value: 4.77
2-Ethylhexanol: molecular weight 130.2, C log P value: 2.73
Phenoxyethylacrylate (POA): molecular weight 192.2, C log P value: 2.46
Butylacrylate (BA): molecular weight 128.2, C log P value: 2.20

Note that the molecular weight of the low molecular weight compounds was determined by a formula weight determined by calculation from the atomic weight. Further, the C log P value of the low molecular weight compound was determined by calculation using a software package: Chem Draw Ultra ver. 8.0. (2003 Apr. CambridgeSoft Corporation, USA).

(Photopolymerizable Compound)
Material A: a commercial product of tripropylene glycol diacrylate (molecular weight 300)
Material B: a purified product of the material A
Material C: a commercial product of 3PO-modified trimethylolpropane triacrylate (molecular weight 470)
PEG (400) DA: polyethylene glycol diacrylate (molecular weight 508)
TMP (EO) 6TA: trimethylolpropane EO-modified triacrylate (molecular weight 560)
HDDA: 1,6-hexanediol diacrylate (molecular weight 226)
DOGDA: dioxane glycol diacrylate (molecular weight 326)

The materials A and C are unpurified products, and the material B is obtained by heating the material A to remove low molecular weight compounds (purify). Low molecular weight compounds contained in the materials A, B and C were identified and quantified according to the following measurement method. The results are shown in Table 1.

(Measurement of Content of Low Molecular Weight Compound in Photopolymerizable Compound)

Low molecular weight compounds contained in the materials A, B and C were identified and quantified by GC/MS analysis.

Specifically, each of the above-mentioned materials diluted with methanol to have a content of 5 mass % was employed as a sample. Then, measurements were performed using a GC/MS instruments HP6890GC/HP5973MSD under the following conditions:

(GC/MS Measurement Conditions)
Column: DB-624 (manufactured by J&W scientific, Inc.; internal diameter 0.25 mmid×length 30 m; film thickness 1.4 μm)
Carrier gas: He (flow rate 1.2 mL/min)
Sample injection amount: 1 μL
Injection temperature: 100° C.
Heating profile: 50° C. (retention time 0 min)→20° C./min→250° C. (retention time 10 min)
Detector: MSD A calibration curve for each component detected by mass spectrometry (MS) can be prepared in advance for quantifying the each component by collating a measurement value with the calibration curve.

TABLE 1

| Low Molecular Weight Compound | Molecular Weight | Material A (Mass ppm) | Material B (Mass ppm) | Material C (Mass ppm) |
|---|---|---|---|---|
| BA (ButylAcrylate) | 128.2 | 11.3 | 1.6 | 5.3 |
| Ethylhexanol | 130.2 | 15.3 | 2.5 | 4.4 |
| 1-Octanol | 130.2 | 16.9 | 2.4 | 4.0 |
| 1-Dodecanol | 186.3 | 25.4 | 1.9 | <1 |
| POA (Phenoxyethylacrylate) | 192.2 | 79.8 | 15.4 | 38.8 |
| Total | | 148.7 | 23.8 | 52.5 |

(Gelling Agent)
  Kao wax T-1: distearyl ketone (manufactured by Kao Corporation)
  EXCEPARL SS: stearyl stearate (manufactured by Kao Corporation)
  LUNAC BA: behenic acid (manufactured by Kao Corporation)
  Diamid KP: palmitamide (manufactured by Mitsubishi Chemical Corporation)
  POEM B100: glycerol monobehenate (manufactured by Riken Vitamin Co., Ltd.,)
  Lauryl alcohol
(Photopolymerization Initiator)
  TPO: diphenyl(2,4,6-trimethylbenzoyl)phosphine oxide
  ITX: 2- and 4-isopropylthioxanthone (manufactured by BASF)
(Polymerization Inhibitor)
  UV10: hindered amine-based polymerization inhibitor manufactured by BASF
(Coloring Material)
  PV19: Pigment Violet 19 (7064B manufactured by Dainichiseika Color & Chemicals Mfg. Co., Ltd.)
  2. Preparation and Evaluation of Ink Examples 1 to 8, and Comparative Examples 1 to 6

A photopolymerizable compound, a photopolymerization initiator, a polymerization inhibitor, a gelling agent, and a low molecular weight compound were mixed so as to have the mass ratios as shown in Table 2 or 3, and then the mixtures were each filtered with WAC filter (0.3 μm precision, Pall Corporation) to prepare inks 1 to 8.

Example 9

(Preparation of Pigment Dispersion (M: Magenta))
The following photopolymerizable compound (DPGDA), polymerization inhibitor, and disperser were charged into a 55° C. thermo bath of 200 cc polyethylene container (with a lid), and were dissolved under heating and stirring for 30 minutes using a magnetic stirrer. After the resultant solution was cooled to room temperature, the total amount of the following organic pigment was added thereto, followed by being stirred well. Thereafter, the mixture was charged into a glass bottle together with 100 g of zirconia beads having a diameter of 0.5 mm followed by sealing, and was vibrated and dispersed for two hours using a vibrating mill (Red Devil 5400HC). Thereafter, the zirconia beads were removed to prepare a pigment dispersion having the following composition:
(Composition of Pigment Dispersion)
  Photopolymerizable Compound: Dipropylene glycol diacrylate (DPGDA) (Laromer DPGDA manufactured by BASF) 71.5 parts by mass
  Polymerization Inhibitor: Irgastab UV10 (manufactured by CIBA Japan K.K.) 0.5 parts by mass
  Organic Pigment: PV19: Pigment Violet 19 (7064B manufactured by Dainichiseika Color & Chemicals Mfg. Co., Ltd.) 20 parts by mass
  Disperser: BYK JET-9150 9 parts by mass
(Preparation of Ink)
Ink 9 was prepared similarly to Example 1 except that the resultant pigment dispersion, photopolymerizable compound, photopolymerization initiator, polymerization inhibitor, gelling agent, and low molecular weight compound were mixed so as to have the mass ratios as shown in Table 2.

The discharge stability and an odor of the resultant ink were evaluated according to the following method.
(Discharge Stability)
The resultant ink was introduced into an inkjet head (HA1024 manufactured by KONICA MINOLTA Inc.). The ink was discharged to be landed on a recording medium under the conditions of a resolution of 720×720 dpi in an ambient temperature of 25° C. and an ambient humidity of 55%, and fifty fine lines having a length of 100 mm were printed. The temperature during discharging was set at 80°. OK TOPCOAT (printing paper) was used as the recording medium. An LED lamp was used as an UV irradiation light source to irradiate the printed ink with UV rays with an energy of 250 mJ for curing the ink.

The number of dot defects occurring in the above-mentioned fifty fine lines when using each ink was visually counted.
  A: The number of pixels not forming an image is less than 5
  B: The number of pixels not forming an image is 5 or more to less than 10
  C: The number of pixels not forming an image is 10 or more to less than 20
  D: The number of pixels not forming an image is 20 or more
(Odor)
The printed image was contained in a zipped 30 cm×30 cm vinyl bag, and was left to stand for 24 hours. Thereafter, the zip was released to evaluate an odor. For the evaluation, an average value obtained by averaging evaluation values of 10 persons (an integer obtained by rounding off a figure in the first decimal place, in a case where the average value includes a decimal) was employed. Under the evaluation criteria, evaluations equal to or higher than C are determined to have no practical problem.
  A: No odor is sensed at all
  B: There is a slight odor, but the odor is hardly noticeable
  C: There is a certain degree of odor, but the odor is not at an uncomfortable level
  D: There is a strong odor The evaluation results of Examples 1 to 9 are shown in Table 2; and the evaluation results of Comparative Examples 1 to 6 are shown in Table 3. In Tables 2 and 3, all the units of the numerical values other than the total amount of low molecular weight compounds indicate "parts by mass."

TABLE 2

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Radical | Material A | | | | | | | | | |
| Polymerizable | Material B | 50 | 30 | 30 | 30 | 30 | 30 | 30 | 30 | 30 |
| Compound | Material C | 10 | 20 | 10 | | | 10 | 10 | 10 | 10 |
| | PEG(400)DA | | 20 | 30 | 20 | 20 | 20 | 30 | 30 | 20 |
| | TMP(EO)6TA | 32.5 | 15 | 20 | 30 | 30 | 29.5 | 20 | 20 | 10 |
| | HDDA | | | | 10 | 10 | | | | |
| | DOGDA | | | | | | | | | |

TABLE 2-continued

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Photoradical polymerization Initiator | TPO | 6 | 6 | 6 | 6 | 6 | 6 | 6 | 6 | 6 |
|  | ITX | 0.3 | 0.3 | 0.3 | 0.3 | 0.3 | 0.3 | 0.3 | 0.3 | 0.3 |
| Polymerization Inhibitor | UV-10 | 0.2 | 0.2 | 0.2 | 0.2 | 0.2 | 0.2 | 0.2 | 0.2 | 0.2 |
| Gelling Agent | Kao Wax T1 | 0 | 7 | 2 | 2 | 2 |  | 2 | 2 | 2 |
|  | EXCEPARL SS | 1 | 1.5 | 1.5 | 1.5 | 1.5 |  | 1.5 |  | 1.5 |
|  | LUNAC BA |  |  |  |  |  | 2 |  |  |  |
|  | Diamid KP |  |  |  |  |  | 1.5 |  |  |  |
|  | POEM B100 |  |  |  |  |  | 0.5 |  |  |  |
|  | Lauryl Alcohol |  |  |  |  |  |  |  | 1.5 |  |
| Low Molecular Weight Compound | 1-Octanol |  |  | 0.005 |  |  |  |  |  |  |
|  | 1-Dodecanol |  |  |  | 0.003 |  |  |  |  |  |
|  | 2-Ethylhexanol |  |  |  |  | 0.003 |  |  |  |  |
|  | POA |  |  |  |  |  |  |  |  |  |
|  | BuA |  |  |  |  |  |  |  |  |  |
| Coloring Material | Magenta Dispersion |  |  |  |  |  |  |  |  | 20 |
| Total | Ink Total Mass [Mass %] | 100 | 100 | 100 | 100 | 100 | 100 | 100 | 100 | 100 |
|  | Low Molecular Weight Compound Total Amount [Mass ppm] | 17 | 18 | 62 | 37 | 37 | 12 | 12 | 12 | 12 |
| Evaluation | Discharge Stability | B | B | A | A | A | B | B | C | B |
|  | Odor | A | A | B | A | A | A | A | A | A |

TABLE 3

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Radical Polymerizable Compound | Material A |  |  |  |  |  | 70 |
|  | Material B | 30 | 30 | 30 | 30 | 30 |  |
|  | Material C |  |  |  |  |  | 5 |
|  | PEG(400)DA | 20 | 20 | 20 | 20 | 30 | 10 |
|  | TMP(EO)6TA | 40 | 40 | 40 | 40 | 20 | 7.5 |
|  | HDDA |  |  |  |  |  |  |
|  | DOGDA |  |  |  |  | 10 |  |
| Photoradical polymerization Initiator | TPO | 6 | 6 | 6 | 6 | 6 | 6 |
|  | ITX | 0.3 | 0.3 | 0.3 | 0.3 | 0.3 | 0.3 |
| Polymerization Inhibitor | UV-10 | 0.2 | 0.2 | 0.2 | 0.2 | 0.2 | 0.2 |
| Gelling Agent | Kao Wax T1 | 2 | 2 | 2 | 2 | 2 | 0 |
|  | EXCEPARL SS | 1.5 | 1.5 | 1.5 | 1.5 | 1.5 | 1 |
|  | LUNAC BA |  |  |  |  |  |  |
|  | Diamid KP |  |  |  |  |  |  |
|  | POEM B100 |  |  |  |  |  |  |
|  | Lauryl Alcohol |  |  |  |  |  |  |
| Low Molecular Weight Compound | 1-Octanol | 0.01 |  |  |  |  |  |
|  | 1-Dodecanol |  | 0.01 |  |  |  |  |
|  | 2-Ethylhexanol |  |  |  |  |  |  |
|  | POA |  |  | 0.01 |  |  |  |
|  | BuA |  |  |  | 0.01 |  |  |
| Coloring Material | Magenta Dispersion |  |  |  |  |  |  |
| Total | Ink Total Mass [Mass %] | 100 | 100 | 100 | 100 | 100 | 100 |
|  | Low Molecular Weight Compound Total Amount [Mass ppm] | 107 | 107 | 107 | 107 | 7 | 107 |
| Evaluation | Discharge Stability | D | D | C | C | D | D |
|  | Odor | D | D | D | D | A | D |

As shown in Table 2, all the inks of Examples 2 to 9 in which the content of the specific low molecular weight compound is set within a range of 10 mass ppm or more to 100 mass ppm or less exhibit favorable discharge stability and a reduced odor as well.

In contrast, as shown in Table 3, the inks of Comparative Examples 1 to 4 and 6 in which the content of the specific low molecular weight compound is set more than 100 mass ppm exhibit not only the occurrence of an odor but also low discharge stability. It is assumed that the reason for the low discharge stability of the inks of Comparative Examples 1 to 4 and 6 is because many of the specific low molecular weight compounds are evaporated, causing the ink to be more viscous near the inkjet nozzle. On the other hand, the ink of Comparative Example 5 in which the content of the specific low molecular weight compound is set less than 10 mass ppm exhibit low discharge stability. This is because the solubility of the gelling agent is lowered, causing crystals of the gelling agent to be precipitated during the discharge of the ink.

The inks of Examples 3 to 5 in which the content of the low molecular weight compound is 30 mass ppm or more exhibit higher discharge stability than the inks of Examples 1, 2, 6 and 7 in which the content of the low molecular weight compound is less than 30 mass ppm. This is considered to be because the gelling agent in the ink interacts with the low molecular weight compound, so that the solubility of the gelling agent is enhanced.

Further, the ink of Example 7 using a gelling agent containing a hydrocarbon group having fourteen or more carbon atoms exhibits more favorable discharge stability than the ink of Example 8 using a gelling agent containing a hydrocarbon group having twelve carbon atoms. This is considered to be because the gelling agent containing a hydrocarbon group having fourteen or more carbon atoms easily interacts with the low molecular weight compound than the gelling agent containing a hydrocarbon group having less than fourteen carbon atoms, so that the solubility of the gelling agent is more likely to be enhanced.

INDUSTRIAL APPLICABILITY

According to the present invention, it is possible to provide a photocurable inkjet ink having favorable discharge stability and a reduced odor.

What is claimed is:

1. A photocurable inkjet ink comprising:
    a photopolymerizable compound;
    a photopolymerization initiator;
    a gelling agent in an amount of 0.5 mass % or more to 10 mass % or less based on the photocurable inkjet ink; and
    a low molecular weight compound in an amount of 10 mass ppm or more to 100 mass ppm or less, the low molecular weight compound having a molecular weight of 200 or less and a hydrophobic group having four or more carbon atoms, and the low molecular weight compound being different from the photopolymerizable compound,
    wherein the gelling agent is an aliphatic ketone represented by general formula (G1) or an aliphatic ester represented by General formula (G2):

R1-CO—R2    General formula (G1)

where each of R1 and R2 is a $C_9$-$C_{25}$ linear or branched hydrocarbon group, R3-COO—R4    General formula (G2)

where each of R3 and R4 is a $C_9$-$C_{25}$ linear or branched hydrocarbon group.

2. The photocurable inkjet ink according to claim 1, wherein
    the photopolymerizable compound is a radical polymerizable compound, and
    the radical polymerizable compound contains a multifunctional radical polymerizable compound.

3. The photocurable inkjet ink according to claim 2, wherein a content of the multifunctional radical polymerizable compound is 70 mass % or more based on a total mass of the photopolymerizable compound.

4. The photocurable inkjet ink according to claim 1, wherein the low molecular weight compound is at least one low molecular weight compound selected from the group consisting of 1-octanol, 1-dodecanol, 2-ethylhexanol, butylacrylate and phenoxyethylacrylate.

5. The photocurable inkjet ink according to claim 1, wherein the amount of the low molecular weight compound is 30 mass ppm or more to 100 mass ppm or less based on the photocurable inkjet ink.

6. The photocurable inkjet ink according to claim 1, wherein the photocurable inkjet ink further contains a pigment.

7. The photocurable inkjet ink according to claim 1, wherein a C log P value of the low molecular weight compound is 2.0 or more to 5.0 or less.

8. The photocurable inkjet ink according to claim 1, wherein the low molecular weight compound is at least one low molecular weight compound selected from the group consisting of 1-octanol, 1-dodecanol, and 2-ethylhexanol.

9. The photocurable inkjet ink according to claim 1, wherein the low molecular weight compound is at least one low molecular weight compound selected from the group consisting of butylacrylate and phenoxyethylacrylate.

10. An image forming method comprising:
    discharging the photocurable inkjet ink according to claim 1 from a nozzle of an inkjet head to land the ink on a recording medium; and
    irradiating the landed ink with actinic radiation to cure the ink.

11. The image forming method according to claim 10, wherein an amount of the ink discharged from the nozzle of the inkjet head is 2 pL or more to 20 pL or less.

* * * * *